United States Patent [19]

Saito et al.

[11] Patent Number: 4,918,538
[45] Date of Patent: Apr. 17, 1990

[54] ELECTRONIC PHOTOGRAPHY SYSTEM WITH STILL AND MOTION PICTURE MODES

[75] Inventors: Syuichiro Saito, Kanagawa; Tadashi Okino, Tokyo, both of Japan

[73] Assignee: Canon Kabushiki Kashia, Tokyo, Japan

[21] Appl. No.: 112,957

[22] Filed: Oct. 23, 1987

Related U.S. Application Data

[62] Division of Ser. No. 559,221, Dec. 8, 1983, Pat. No. 4,714,966.

[30] Foreign Application Priority Data

Dec. 14, 1982 [JP] Japan .................................. 57-218876

[51] Int. Cl.⁴ ...................... H04N 5/238; H04N 5/781
[52] U.S. Cl. ..................................... 358/335; 358/228; 358/906
[58] Field of Search ............... 358/906, 909, 228, 335; 358/310; 360/35.1, 33.1; 352/141; 354/446, 449, 450, 451

[56] References Cited

U.S. PATENT DOCUMENTS

| | | | |
|---|---|---|---|
| 4,066,347 | 1/1978 | Wagensonner | 352/141 |
| 4,324,464 | 4/1982 | Wick | 352/141 |
| 4,409,620 | 10/1983 | Enomoto | 358/228 |
| 4,551,764 | 11/1985 | Ogawa | 358/906 |
| 4,558,368 | 12/1985 | Aoki et al. | 352/141 |
| 4,695,894 | 9/1987 | Saito et al. | 358/228 |

FOREIGN PATENT DOCUMENTS 54-140507  10/1979  Japan .................................. 358/906
56-100575   8/1981  Japan .

Primary Examiner—Steven L. Stephan
Assistant Examiner—Robert A. Weinhardt
Attorney, Agent, or Firm—Toren, McGeady & Associates

[57] ABSTRACT

An electronic still/motion picture photography system including an optical-electronic transducer for producing electrical signals responsive to an optical image, a light information control member, such as a diaphragm, for controlling the state of light information incident on the transducer, a discriminating circuit for discriminating the state of light information as it is controlled by the light information control member, a drive source responsive to the output of the discriminating circuit for driving the light information control member, a recorder for recording the output of the transducer, an indicating switch for indicating the amount of output representing the exposed image to be recorded by the recorder, and a operating circuit responsive to the output of the indicating switch for changing the driving characteristics of the drive source.

14 Claims, 6 Drawing Sheets

ELECTRONIC PHOTOGRAPHY SYSTEM WITH STILL AND MOTION PICTURE MODES

This is a division of application Ser. No. 559,221, filed Dec. 8, 1983 now Pat. No. 4,714,966.

BACKGROUND OF THE INVENTION

1. Field of the Invention

This invention relates to an electronic photography system having still and motion picture modes.

2. Description of the Prior Art

It is known in the art to provide a so-called electronic camera having incorporated therein a CCD image sensor for producing electronic signals responsive to an optical image which are then recorded on a magnetic drum or magnetic disc.

On the other hand, to utilize the function of such electronic camera effectively, it is also considered to use the output of the electronic camera as an input signal source for commercially available VTRs by connecting an adaptor. It has, however, been now found that when the VTR of continuous recording capability is supplied with the output of the electronic camera, the exposure control device such as the diaphragm device, of the electronic camera cannot work with suitable responsiveness.

In other words, since the exposure control device of the electronic camera is designed to take a still picture, the exposure control must be made in delicate response to changes of the brightness of an object to be photographed. For example, where a moving person is to be photographed, even when a shutter release is actuated as soon as that person has entered from under the glaring sun into the shadow of trees, the requirement of obtaining a proper exposure must always be satisfied.

With such electronic camera coupled with the VTR, when being panned, therefore, as the level of brightness of the scene suddenly changes at frequent intervals with corresponding changes of the exposure value, a very ugly picture is taken. This problem arises not only from such light response characteristics of the diaphragm control but also from that of the shutter control and focusing control. An electronic camera which has overcome the above-described drawbacks has not so far been conceived.

SUMMARY OF THE INVENTION

An object of the present invention is to provide an image pickup device which overcomes the drawbacks of the conventional technique.

Another object of the invention is to provide a diaphragm control device having controllable response characteristic.

Still another object of the invention is to provide an electronic photography system in which the control characteristic of the diaphragm or the like properly changes depending upon the amount of image to be recorded.

DETAILED DESCRIPTION OF THE PREFERRED EMBODIMENTS

Figure 1:
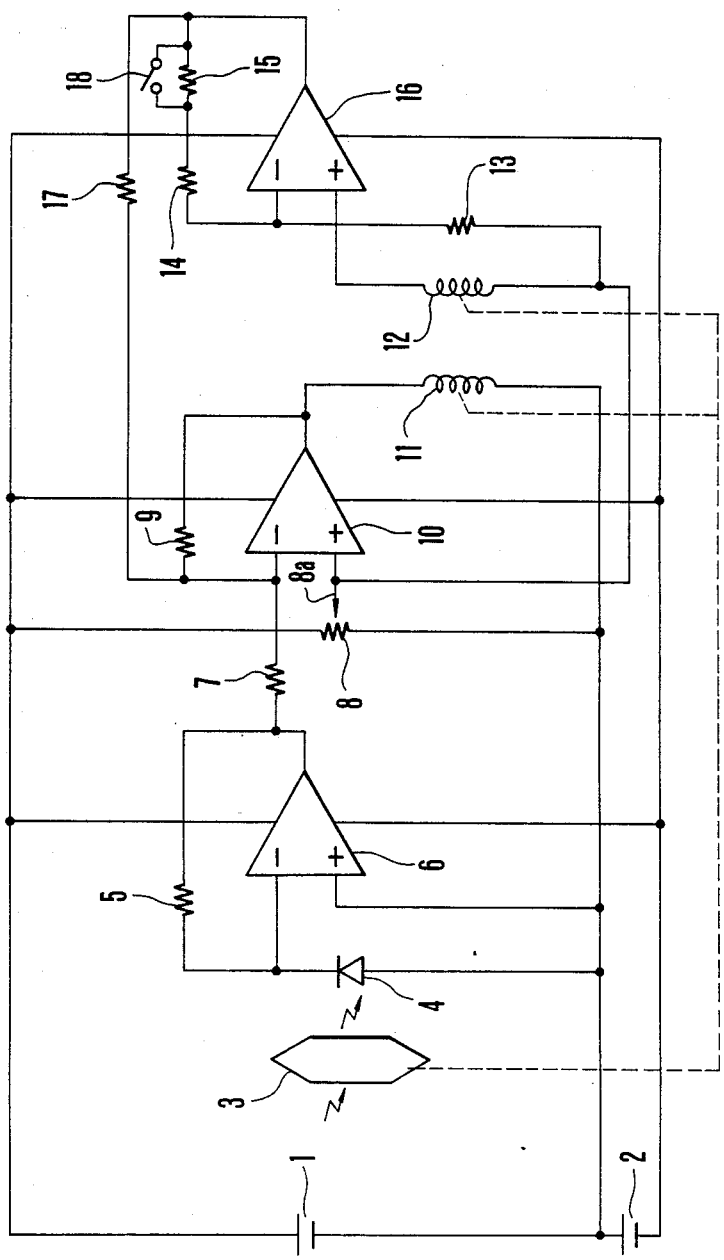
FIG. 1 is an electrical circuit diagram of a diaphragm control usable in a first embodiment of an image pickup device according to the invention.

The present invention will be described in connection with embodiments thereof by reference to the accompanying drawings. Referring first to FIG. 1, there is shown a first embodiment of the invention. In this embodiment, light from an object to be photographed passes through an electromagnetically operated diaphragm to a light metering circuit. Whether the output of the light metering circuit is above or below a prescribed level sensed by a discriminating circuit is detected to indicate the direction in which the aforesaid diaphragm must be moved. The aforesaid discriminating circuit is provided with a signal forming circuit for changing the input signal to the discriminating circuit. The signal forming circuit, when rendered operative, alters the speed of movement of the diaphragm.

In FIG. 1, two batteries 1 and 2 are connected in series with each other. Three operational amplifiers 6, 10 and 16 each are connected in parallel to the batteries 1 and 2. A non-inverting input terminal of operational amplifier 6 is connected to a junction point of batteries 1 and 2 (hereinafter called circuit ground), an inverting input terminal of which is connected through a photosensitive element 4 as light receiving means to the circuit ground, and also through a resistor 5 to an output terminal thereof. The photosensitive element 4, resistor 5 and operational amplifier 6 constitute a light metering circuit in the form of a photoelectric transducing amplifier for producing an output in the form of a voltage proportional to the intensity of light entering through an opening aperture of diaphragm blades 3, as a diagraphm member, to the photosensitive element 4, as is well known in the art. A non-inverting input of operational amplifier 10 is connected to a slider 8a of a variable resistor 8 which is connected across the positive terminal of battery 1 and the circuit ground. An inverting input of operational amplifier 10 is connected through a resistor 7 to the output of operational amplifier 6. An output of operational amplifier 10 is connected to a diaphragm driving coil 11 as driving means and therefrom to the circuit ground, and is also connected through a resistor 9 to the inverting input thereof. The coil 11 cooperates with a movable member or a permanent magnet 57. The variable resistor 8, resistor 9 and operational amplifier 10 constitute a discriminating circuit serving as discriminating means. The driving coil 11 is arranged so that when the output of operational amplifier 10 is of negative voltage, the size of the opening aperature of the diaphragm decreases, and when of positive voltage, it increases. A diaphgragm braking coil 12, which also serves as speed sensing means for the diaphragm, is connected, at one end thereof, to a non-inverting input of the operational amplifier 16 and, at the opposite end, to the non-inverting input of operational amplifier 10. An inverting input of operational amplifier 16 is connected through a resistor 13 to the non-inverting input of operational amplifier 10, and also through a string of resistors 14 and 15 to an output thereof. Therefore, the operational amplifier 10 constitutes a subtracting circuit for the signals from the photosensitive element 4 and braking coil 12. Also the braking coil 12 constitutes a part of means for sensing the speed of rotation of the permanent magnet 57, to be more fully described later, serving as the deflecting member, the speed of which corresponds to the speed of movement of the diaphragm blades. As the diaphragm closes down, the braking coil 12 exerts a positive electromotive force of a magnitude proportional to the speed of movement of the diaphragm. As it is opening, a negative electromotive force is exerted. The output of operational amplifier 16 is connected through a resistor 17 to the inverting input of operational amplifier 10. A switch 18, serving as a mode selector, is connected across the aforesaid resistor 15. When switch 18 is OFF, a first computation mode is selected to operate so that the response speed of the diaphragm is relatively fast, and when ON, it becomes relatively slow. As will be more fully described later, this switch 18 is turned on when in a still picture mode, and off when in a movie picture mode. It is also to be noted that the resistors 5, 7, 8, 9, 13, 14, 15 and 17 and operational amplifiers 6, 10 and 16 form computer means. Again, the diaphragm 3 controls the aperature adjustment for light information given to an image sensor 311, serving as an image pickup means, to be described later, and functions as light information control means. As the light information control means, besides this, a shutter and optical lens are included.

The operation of the circuit of FIG. 1 is as follows: When a power switch (not shown) is closed, a voltage of a magnitude proportional to the intensity of light incident upon photosensitive element 4 after having passed through the aperture opening of diaphragm 3, is generated at the output of operational amplifier 6.

Assuming that the incident light is so strong that the output voltage of operational amplifier is higher than the divided potential appearing at the slider 8a of the variable resistor 8, then the output of operational amplifier 6 is inverted by operational amplifier 10, while being amplified. The output of operational amplifier 10, in the form of a negative voltage, is applied to the driving coil 11. Hence, the diaphragm 3 is driven to close down the size of its opening aperture. As a result, the illumination on the photosensitive element 4 is weakened. As the diaphragm 3 moves in a direction to close down, as has been described before, the braking coil 12 generates a positive electromotive force which is then applied to the non-invertion input of operational amplifier 16. Responsive to this, operational amplifier 16 produces an output in the form of a negative voltage. This negative voltage is fed back through resistor 17 to the inverting input terminal of operational amplifier 10, where that negative voltage is inverted and amplified to form a positive voltage component. Thus, during the closing operation of the diaphragm 3, the value of voltage appearing at the output of operational amplifier 10 is equal to the added value of the negative voltage from operational amplifier 6 and the positive voltage from operational amplifier 16. Therefore, the current flowing through the driving coil 11 is reduced by a corresponding magnitude to the electromotive force generated in braking coil 12 to slow down the speed of motion of the diaphragm 3.

Letting R13, R14 and R15 denote the values of resistors 13, 14 and 15, we have the following values of non-inverting amplification gain of operational amplifier 16, $$\left(1 + \frac{R14 + R15}{R13}\right) \text{when switch 18 is OFF, and}$$

$$\left(1 + \frac{R14}{R13}\right) \text{when switch 18 is ON.}$$

For the first operation mode, switch 18 is set in OFF state. Because of the gain being higher, under the condition that the electromotive force exerted in the braking coil 12 is of the same magnitude, a higher braking voltage is produced at the output of operational amplifier 16, causing the ratio of the signal level from braking coil 12 to the signal level from the photosensitive element 4 to increase with the decrease in the intensity of current flowing to the driving coil 11. In effect, the diaphragm 3 is driven to move at a slower speed. For the second operation mode, switch 18 is turned on, whereby the response speed of the diaphragm 3 can be made faster.

Alternatively, assuming that the output voltage of operational amplifier 6 is lower than the divided voltage appearing at the slider 8a of variable resistor 8 and applied to the non-inverting input of operational amplifier 10, then operational amplifier 10 produces another output in the form of a positive voltage. Responsive to this, driving coil 11 opens the diaphragm 3. As the diaphragm 3 is opening, a negative electromotive force is generated in braking coil 12, and, after having been non-inverted and amplified by operational amplifier 16, is fed back to operational amplifier 10, whereby the positive voltage at the output of operational amplifier 10, or the driving voltage for the coil 11, is reduced to slow down motion of the diaphragm 3. Such an effect is similar to that described in connection with the closing operation of the diaphragm. It is also similar that when switch 18 is OFF, the gain of operational amplifier 16 is higher, and the speed of movement of the diaphragm 3 is slower, than when switch 18 if ON.

Figure 2:
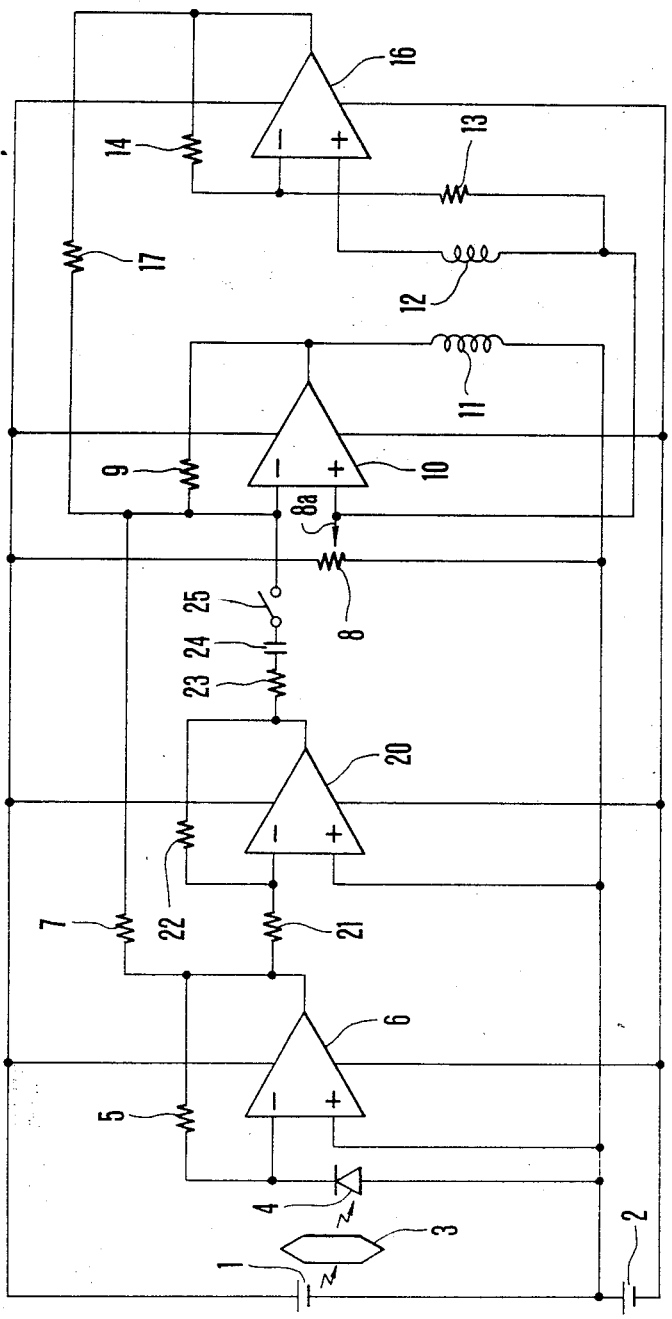
FIG. 2 is similar to FIG. 1 except that a second embodiment is illustrated.

A second embodiment of the invention is shown in FIG. 2 where the same reference characters have been employed to denote parts similar to those shown in FIG. 1, and their detailed explanation is omitted.

The circuit of FIG. 2 is different from that of FIG. 1 in that the resistor 15 and the switch 18 are removed, and, instead, one more operational amplifiers 20, are added in parallel connection to the resistor 7. A non-inverting input of operational amplifier 20 is connected to the circuit ground, an inverting input of which is connected through a resistor 21 to the output of operational amplifier 6 and also through a resistor 22 to an output terminal thereof. The output of operational amplifier 20 is further connected through a resistor 23, a capacitor 24 and a operation mode selection means or switch 25 which are connected in series with each other to the inverting input of operational amplifier.

In this embodiment, resistors 5, 7, 8, 9, 13, 14, 17, 21, 22 and 23, operational amplifiers 6, 10, 16 and 20 and capacitor 24 constitute operation means.

It is also to be noted that the switch 25 functions to change over between frequency characteristics in the path from amplifier 6 to amplifier 10.

The operation of the circuit of FIG. 2 is as follows: When the still picture mode is set by means to be described later, switch 25 is turned off and the first operation mode is set. Then the circuit operates in a similar manner to that described in connection with FIG. 1.

Conversely, when the motion picture mode is set, the switch 25 is turned on, whereby the second operation mode is set. In a situation where the object brightness does not vary with time, therefore, because the operational amplifier 20 is cut off by capacitor 24, similarly to FIG. 1, the size of the opening aperture of the diaphragm 3 is adjusted to a presetting for a prescribed level of illumination on the photosensitive element 4 and is held stable in this position.

Let us suppose that the ambient light starts to change from this state. Since, in this case, the intensity of light incident on the photosensitive element 4 changes, the output voltage of operational amplifier 6 also changes. Under the condition that the resistors 21 and 22 have resistance values equal to each other, and the resistors 7 and 23 also have equal resistance values, the output voltage of operational amplifier 6 is inverted and amplified to a gain of unity by operational amplifier 20. Therefore, a voltage of opposite sign to, and equal in absolute value to, those of the output of operational amplifier 6, appears at the output of operational amplifier 20. Then, as the output of operational amplifier 6 changes, the output of operational amplifier 20 is changed in the opposite direction by the same difference in absolute magnitude. As a result, soon after the change has started, operational amplfiers 6 and 20 produce outputs of opposite sign but equal to each other in magnitude which are then applied, through the respective resistors 7 and 23 having equal resistance values, to operational amplifier 10, where they cancel each other. Being reluctant to follow up the change of the illumination, therefore, the diaphragm does not change the size of its opening aperture immediately. As charging of capacitor 24 through resistor 23 goes on, however, the cancelling effect is gradually being lost, allowing the diaphragm 3 to change the size of its opening aperture so as to maintain constant the level of illumination on the photosensitive element 4. Determination of this cancelling time can be made as desired by taking the time constant of resistor 23 and capacitor 24 at an appropriate value. It will be appreciated that even by this method, the change in the force of inertia of the diaphragm against the rapid variation with time of the illumination can be achieved.

Figure 3:
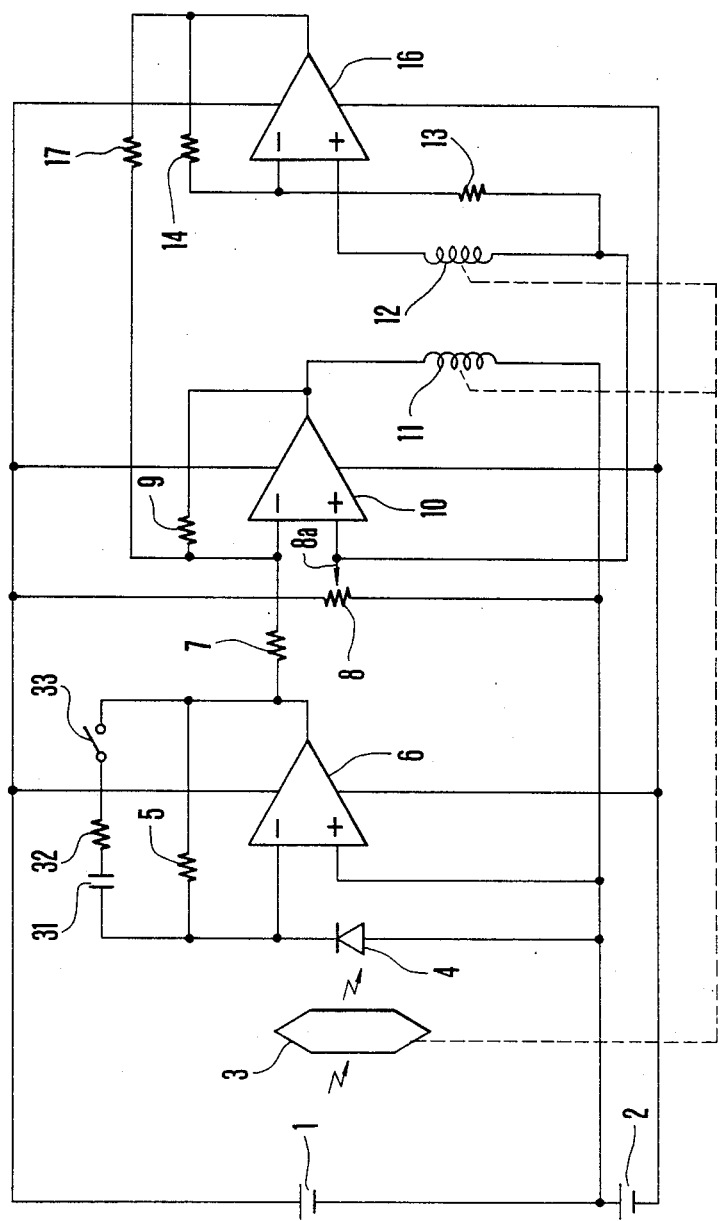
FIG. 3 is similar to FIG. 1 except that a third embodiment is illustrated.

A third embodiment of the invention is shown in FIG. 3 wherein the same reference characters have been employed to denote parts similar to those shown in FIG. 1.

The circuit of FIG. 3 is different from that of FIG. 1 in that the resistor 15 and switch 18 are removed and, instead, a series circuit of a capacitor 31, a resistor 32 and a switch 33, serving as mode control means, is connected in parallel to the resistor 5. The resistance value of the resistor 32 is far smaller than that of the resistor 5.

In this embodiment, resistors 5, 7, 8, 9, 13, 14, 17 and 32, amplifiers 6, 10 and 16 and capacitor 31 constitute operation means.

It is also to be noted that even in this embodiment, the frequency characteristic in the operation means is altered by ON and OFF operation of switch 33 as the mode control means.

The operation of the circuit of FIG. 3 is as follows: When in the still picture mode, switch 33 is OFF, and the circuit operates in a similar manner to that described in connection with FIG. 1. When switched to the motion picture mode, switch 33 is turned on. In this position, no variation with time of the illumination causes capacitor 31 to become as if it were absent, and the diaphragm 3 is kept in a stable equilibrium for the illumination on the photosensitive element 4 at a prescribed level. Then when the degree of illumination starts to rapidly change, operational amplifier 6 would ordinarily change its output voltage correspondently. However, because of the inclusion of charging capacitor 31, the output voltage cannot change so fast. Therefore, during the time necessary to fully charge capacitor 31, the diaphragm 3 is slowly accelerated. The charging time constant is determined by the static capacitance of capacitor 31 and the resistance value of resistor 5. To obtain a desired acceleration, it is only necessary to adjust the capacitance and resistance to appropriate values. It is also to be noted that while resistor 32 has a function of returning the phase rotation in the high-frequency wave to zero and is to strengthen the stabilization of the system, it may be omitted provided that a sufficient stability of the system is secured without it.

It will be appreciated that even by the circuit of FIG. 3, the acceleration of the diaphragm can be controlled by the ON and OFF operation of switch 33 responsive to setting of either one of the still and motion picture modes so that when in the motion picture mode, a buffering action against the rapid change of the ambient light with time is brought in.

Figure 4:
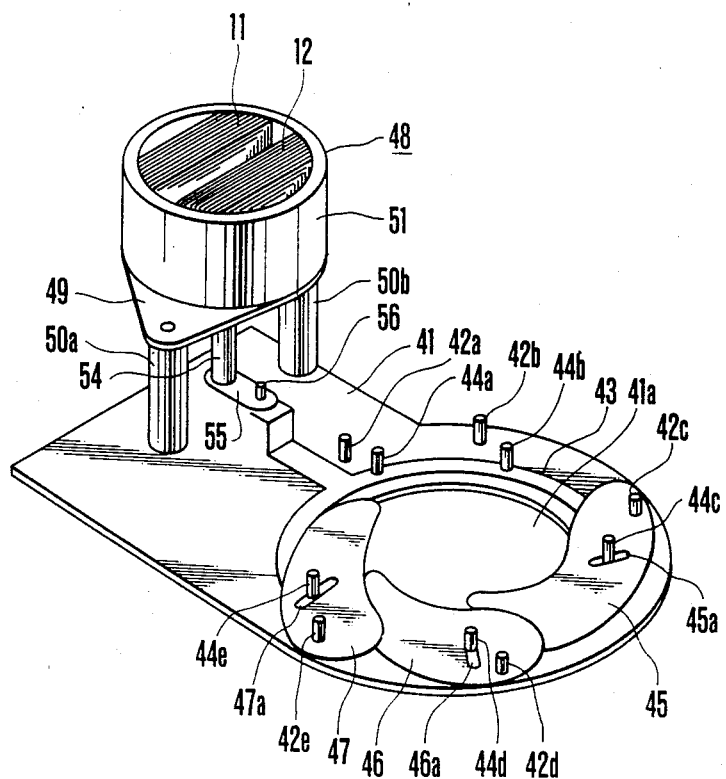
FIG. 4 is a perspective view of an example of the diaphragm.

Here, FIG. 4 illustrates the diaphragm the operation of which is controlled by the circuits of FIG. 1 to FIG. 3. For the purpose of better understanding, some of the diaphragm blades and a cover therefore are removed.

In FIG. 4, a base plate 41 with an aperture 41a fixedly carries five pivot pins 42a to 42e on which respective blades 45, 46 and 47 (the remaining two blades being not shown) are movably mounted. A sector ring 43 is rotatably mounted on the base plate 41 in concentric relation to the round aperture 41a and fixedly carries linkage pins 44a to 44e extending through and projecting beyond respective slots 45a to 47a in the diaphragm blades 45 to 47. Member 48 is a drive portion; 49 is a support having two legs 50a and 50b; 51 is a yoke; 11 is the driving coil as the driving means; 12 is the braking coil; 54 is an output shaft to which is connected a lever 55. This lever 55 is drivingly connected through a pin 56 to the sector ring 43.

Figure 5:
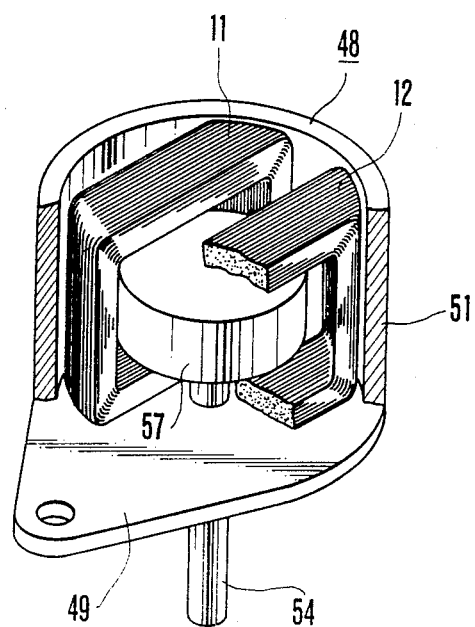
FIG. 5 illustrates the details of the driving portion of the diaphragm of FIG. 4.

FIG. 5 shows the internal mechanism of the drive unit 48 where the before-mentioned deflecting member takes the form of a permanent magnet rotor 57 with the poles oriented diametrically. When the driving coil 11 is supplied with current, the magnetic field of permanent magnet rotor 57 interacts with the current flowing through that magnetic field to exert a force according to Fleming's left-hand rule. As the permanent magnet rotor 57 reacts, the output shaft 54 rotates in a clockwise direction as viewed in the drawing.

Motion of the output shaft 54 is transmitted through lever 55 and pin 56 to turn sector ring 43 counterclockwise, and therefrom through linkage pins 44a to 44e to turn the diaphragm blades about pivot pins 42a to 42e clockwise, whereby the size of the opening aperature defined by the blades is decreased. Such movement of the permanent rotor 57, in turn, causes generation of an electromotive force in the braking coil 12 by which overrunning of the diaphragm blades is restricted.

As has been described in greater detail above, according to the present invention, adjustment of the illumination on the image sensor in the camera to a prescribed level can be automatically controlled in such a way that when the intensity of light on the photosensitive element is high, the diaphragm is closed down, and when it is low, it is opened. Another feature is that as the object brightness starts to vary from the level sensed by the light metering circuit at a given speed, in the still picture mode, the aperature opening of the diaphragm is varied at a corresponding speed so as to maintain constant the illumination on the image sensor in the camera as if the object brightness were constant, and, in the motion picture mode, the aperture is varied at gradually ever-increasing speeds capable of reaching that corresponding speed during a time which can be taken at a desired value.

Figure 6:
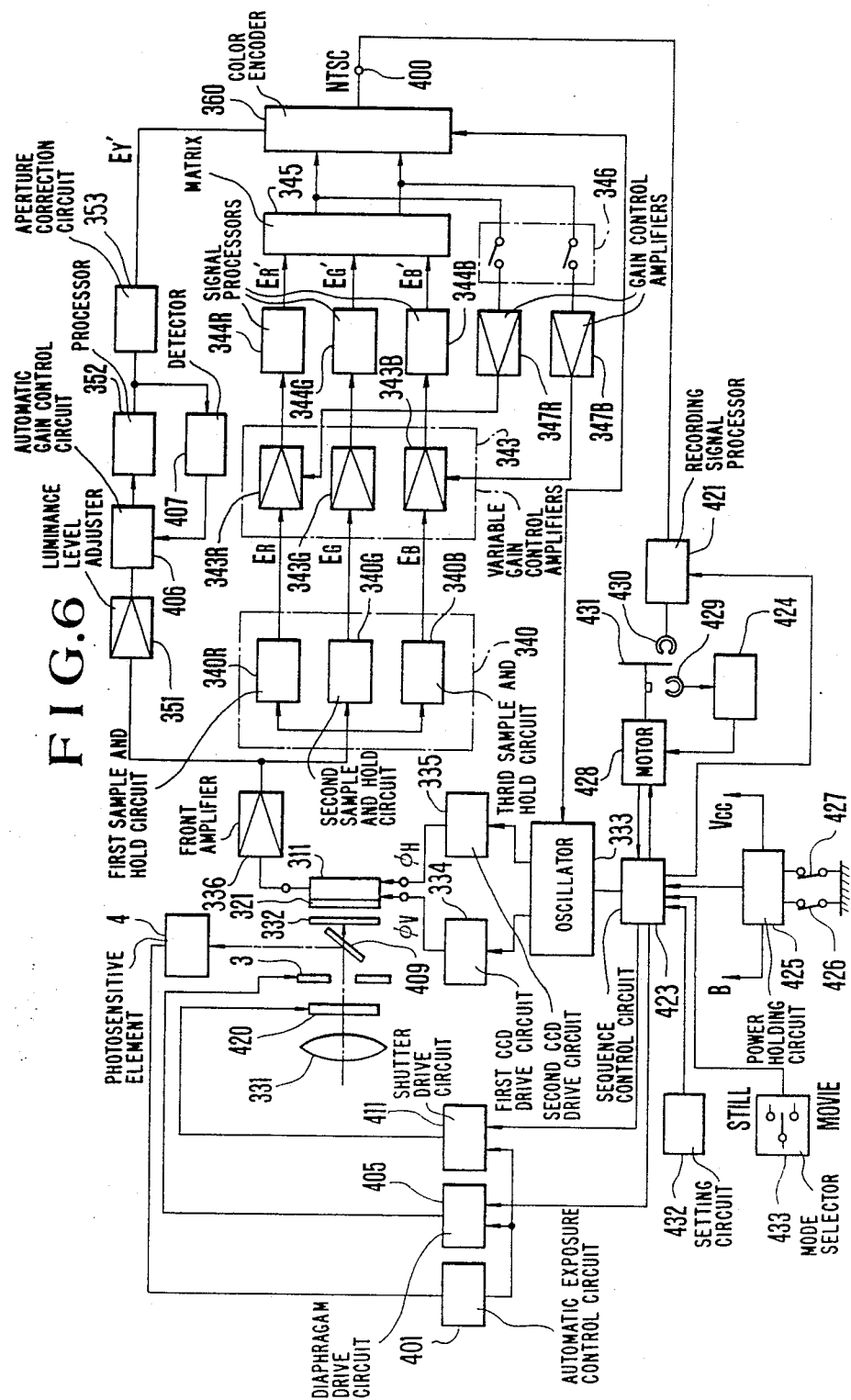
FIG. 6 is a block diagram of an electronic photography system of the invention.

FIG. 6, in block diagram form, illustrates an embodiment of an electronic photography system of the present invention. Light entering through a photographic objective lens 331 passes through a mechanical or solid-state-physical shutter 420, the diaphragm of the invention and an infrared cut filter 332 to impinge on a CCD image sensor 311 having a color filter 321 consisting of Red (R), Green (G) and Blue (B) stripes at the front thereof.

It is to be noted here that the CCD image sensor 311 functions as image pickup means for producing electrical information responsive to an optical image formed thereon. It is of course possible to use a vidicon, MOS image sensor or the like in place of the CCD image sensor.

An oscillator 333 produces a train of standard clock pulses which are applid to first and second CCD drive circuits 334 and 335. Responsive to vertical and horizontal transfer clock signals $\phi V$ and $\phi H$, respectively, from circuits 334 and 335, CCD 311 produces video signals including a luminance signal and chrominance signals each in the form of a sequence of charges eR, eG or eB corresponding to the red, green or blue component of an object image. 336 is a front amplifier; 351 is a luminance level adjuster provided in a luminance signal line; 340 is a chrominance signal separating circuit provided in a chrominance signal line. The chrominance signal separating circuit 340 comprises a first sample-and-hold circuit 340R for sampling a red signal ER corresponding to the charges er responsive to the red components, a second sample-and-hold circuit 340G for sampling a green signal EG corresponding to the charges eg responsive to the green components, and a third sample-and-hold circuit 340B for sampling a blue signal EB corresponding to the charges eb responsive to the blue components, and converts the chrominance signals ER, EG and EB to synchronous signals. The chrominance signals, after their signal levels have been adjusted in relation to each other by voltage variable type gain control amplifiers 343R, 343G and 343B constituting a white balance adjuster 343, are applied to processor circuits 344R, 344G and 344B where signal treatments, including gamma correction, are carried out. A matrix circuit 345 receptive of the outputs ER′, EG′ and EB′ of the signal processors 344 produces different color difference signals ER′-EG′ and EB′-EG′ which are then applied to a color encoder 360. The outputs of matrix circuit 345 are fed back through their respective switches 346 and gain control amplifiers 347R and 347B to the white balance adjuster 343. The color encoder 360, responsive to the standard clock pulses from the oscillator 333, synthesizes the aforesaid color difference signals and a luminance signal, to be more fully described later, to form an NTSC type color video signal, for example. The luminance signal line system comprises the luminance level adjuster 351, a processor circuit 352 and an aperture correction circuit 353.

An automatic exposure control circuit 401, responsive to variation of the object brightness, adjusts the diaphragm 3 and/or a shutter 420 so that the NTSC signal appearing at an output terminal 400 is maintained at a suitable constant level. In this practical example, the automatic exposure control circuit 401, which may include resistors 5 and 7 and operational amplifier 6 as shown in FIG. 1, utilizes the output of the photosensitive element 4 as a half-mirror 409 splits off a portion of the light coming from the aperture of the diaphragm to the photosensitive element 4.

The conventional automatic exposure control circuits generally make use of the luminance signal of the luminance signal line system, and are constructed with a detecting portion and a control portion for converting this signal to a DC current component. Even in the present invention, such structure may be employed. However, when using the output of the luminance signal line system this output signal is produced in the form of a sequence of discrete signals synchronized with a field period of 1/60 sec. Thus, responsiveness to the change of the object brightness is considerably restricted.

On this account, therefore, this photography system, of the invention has has been described above, makes use of the photosensitive element 4 with an advantage that the responsiveness in the still picture mode is heightened to the maximum.

The automatic gain control circuit 406 is provided for compensating the level of a signal, to be taken out at the output terminal 400, as the object brightness becomes so low that the required aperture exceeds the maximum value of the diaphragm 3, or the required shutter speed exceeds the longer limit of the shutter 420. For this purpose, the operation of the automatic gain control circuit 406 is controlled by the output of a detector 407 in such a manner that when the output signal of processor 352 falls below a certain level, the gain is increased to a value depending upon the detection potential obtained from the detector 407.

405 is a diaphragm drive circuit, which may include resistors 8 and 9, operational amplifier 10 as well as resistors 13–15 and 17, operational amplifier 16 and switch 18 as shown in FIG. 1; 411 is a shutter drive circuit; 421 is a signal processing circuit receptive of the output from terminal 400 for producing a signal in a form suited for recording; 423 is a sequence control circuit for controlling the operation of a video recorder comprising the recording signal processor 421, shutter drive circuit 411, diaphragm drive circuit 405 and a motor control circuit 424, to be more fully described later as a whole; 425 is a power holding circuit; 426 is a switch arranged to be closed by a first stroke of a two-stroke switch; and 427 is a switch arranged to be closed by a second stroke of the two-stroke switch. By turning on the switch 426, the various circuit portions of the photography system are supplied with current. By turning on the switch 427, recording on a magnetic disc 431 is carried out. Vcc is an electrical power source or battery; B is a power supply line to the various circuits; 424 is a motor control circuit; 428 is a motor whose rotation speed and phase are controlled by the motor control circuit 424; 429 is a detecting head for detecting the phase of rotation of motor 428; and 430 is a recording head for recording the output of the aforesaid recording signal processing circuit 421 on to a magnetic disc 431, serving as a recording medium. These parts, or recording signal processing circuit 421, motor control circuit 424, motor 428, disc 431, magnetic head 430 and the like, constitute video information recording means. 432 is a setting circuit for setting a shutter speed of shutter 420 and/or aperture value of diaphragm 3. When a desired value of shutter speed is set in circuit 432, the diaphragm 3 is servo-driven by the automatic exposure control circuit 401, while the shutter 420 operates with the preset value. When a desired aperture value is set in the circuit 432, shutter 420 is driven by the automatic exposure control circuit 401, and the shutter speed is controlled, while the diaphragm 3 is held stationary at the preset value. Therefore, the photography system operates in modes analogous to the aperture priority and shutter speed priority automatic exposure modes in a film camera. 433 is a mode selector serving as indicating means for indicating changeover between the still and motion picture modes. The indicating output of mode selector 433 is applied to the sequence control circuit 423. The response characteristics in the diaphragm and shutter drive circuits 405 and 411 are controlled in response to the indicating output.

Also along with this, the operation timing of recording signal processing circuit 421 is controlled, whereby, in the still picture mode, one picture format of video signal information is given to head 430 in a predetermined timing. In the motion picture mode, a continuous series of picture formats of video information are given to head 430 so long as switch 427 is ON. That is, mode selector 433 indicates the amount of video information to be recorded in the video information recording means.

Furthermore, in the foregoing embodiments, the response characteristic in the operation means is changed in two steps, but may be in many more steps. Also the response characteristic may be varied continuously.

As has been described above, according to the electronic photography system of the invention, when in the motion picture mode, a flicker-free movie can be obtained. When in the still picture mode, without having to miss good shutter chance, a proper exposure can be always obtained. Thus, an electronic camera usable as a still camera and a cine camera can be realized.

What we claim:

1. A photography system comprising:
(a) a displacing member for an aperture member having an opening size which varies as the displacing member moves;
(b) light receiving means for producing a signal responsive to an amount of light passing through said aperture member;
(c) detecting means for detecting a movement speed of said displacing member;
(d) operating means for operating to create an output of said detecting means and an output of said light receiving means;
(e) drive means responsive to an output of said operating means for moving said displacing member;
(f) mode control means for controlling an operation mode in which said operating means operates so as to vary a movement speed of said aperture member;
(g) picture information recording means for generating picture information responsive to the light passing through said aperture member and for recording said picture information; and
(h) indicating means for indicating an amount of said picture information to be recorded by said picture information recording means, the operation mode being changed depending upon an indication state of said indicating means.

2. A system according to claim 1, further comprising: co-ordinating means for co-ordinating said indicating means and said mode control means so that said operation mode is changed depending upon an indicating state of said indicating means.

3. A photography system comprising:
(a) an aperture member having an opening size which varies as a displacing member moves;
(b) light receiving means for forming a signal responsive to an amount of light passing through said aperture member;
(c) drive means responsive to an output of said light receiving means for moving said displacing member;
(d) mode control means for changing a movement speed of said displacing member; and
(e) picture information recording means for generating picture information responsive to the light passing through said aperture member and for recording said picture information; and
(f) indicating means for indicating an amount of said picture information to be recorded by said picture information recording means, said movement speed of said displacing member being changed depending upon an indicating state of said indicating means.

4. A system according to claim 3, further comprising: means for co-ordinating said indicating means and said mode control means so as to change the movement speed of said displacing member to a value depending upon an indicated state of said indicating means.

5. A diaphrgam control device comprising:
(a) an aperture member having an opening size which varies as a displacing member moves;
(b) light receiving means for forming a signal responsive to an amount of light passing through said aperture member;
(c) detecting means for detecting a movement speed of said displacing member;
(d) operating means for operating on an output of said detecting means and an output of aid light receiving means;
(e) drive means responsive to an output of said operation means for moving said displacing member;
(f) mode control means for controlling an operation mode in said operating means so as to vary responsiveness of said aperture member to the output of said light receiving means; and
(g) indicating means for indicating an amount of picture information to be recorded by picture information recording means, the operation mode being changed in dependence upon an indicating state of said indicating means.

6. A devive according to claim 5, wherein said drive means includes an electric motor.

7. A device according to claim 6, wherein said displacing member includes a rotor.

8. A device according to claim 5, wherein said operating means includes a subtraction circuit for subtracting the output of said detecting means and the output of said light receiving means.

9. A device according to claim 5, wherein said mode control means controls a ratio between the output of said light receiving means and an output of said detecting means.

10. A device according to claim 5, wherein said mode control means controls a frequency characteristic of said operating means.

11. A device according to claim 5, further comprising:

operating means receptive to the output of said light receiving means for producing an output which is applied to said drive means so that the output of said light receiving means is maintained constant.

12. A diaphragm control device comprising:
(a) an aperture member having an opening size which varies as a displacing member moves;
(b) light receiving means for producing a signal responsive to an amount of light passing through said aperture member;
(c) drive means responsive to an output of said light receiving means for moving said displacing member;
(d) indicating means for indicating an amount of picture information to be recorded by picture information recording means; and
(e) mode control means for changing a movement speed of said displacing member in response to an output of said light receiving means and an indicating state of said indicating means.

13. A device according to claim 12, wherein said drive means includes an electric motor.

14. A device according to claim 13, wherein said displacing member includes a rotor.

* * * * *

UNITED STATES PATENT AND TRADEMARK OFFICE
CERTIFICATE OF CORRECTION

PATENT NO. : 4,918,538
DATED : April 17, 1990
INVENTOR(S) : Syuichiro Saito Tadashi Okino It is certified that error appears in the above-identified patent and that said Letters Patent is hereby corrected as shown below:

Title page, item [73] should read as follows:

-- Assignee: Canon Kabushiki Kaisha, Tokyo, Japan --

Signed and Sealed this

Eleventh Day of December, 1990

Attest:

HARRY F. MANBECK, JR.

*Attesting Officer*      *Commissioner of Patents and Trademarks*